United States Patent [19]

Gauron

[11] 4,179,848

[45] Dec. 25, 1979

[54] RESTRAINING APPARATUS FOR BOOKCASES

[76] Inventor: Richard F. Gauron, 26020 SE. 158th St., Issaquah, Wash. 98027

[21] Appl. No.: 946,177

[22] Filed: Sep. 27, 1978

Related U.S. Application Data

[63] Continuation-in-part of Ser. No. 878,754, Feb. 17, 1978, abandoned.

[51] Int. Cl.$^2$ ............................................. E06B 11/00
[52] U.S. Cl. ........................................ 49/124; 211/42; 410/149; 410/150
[58] Field of Search ...................... 49/124; 211/42, 43, 211/7; 5/331; 280/179 B; 108/60; 312/233, 293

[56] References Cited

U.S. PATENT DOCUMENTS

| | | | |
|---|---|---|---|
| 200,576 | 2/1878 | Sherman | 211/42 |
| 203,080 | 4/1878 | Sherman | 211/42 |
| 2,624,055 | 1/1953 | Rude | 5/331 |
| 2,979,738 | 4/1961 | Goldberg | 5/331 |
| 3,309,135 | 3/1967 | Jannetto | 5/331 X |
| 3,762,097 | 10/1973 | Gallo | 280/179 B X |
| 3,984,118 | 10/1976 | Wilson | 280/179 B |

FOREIGN PATENT DOCUMENTS

25743 11/1903 United Kingdom ...................... 211/42

*Primary Examiner*—Philip C. Kannan
*Attorney, Agent, or Firm*—Nicolaas DeVogel

[57] ABSTRACT

A horizontally positioned restraining bar which has at each end a spring biased guiding member. The bar is located in the access opening of a magazine compartment, bookcase, storage bin or the like which is provided with vertically mounted rails at the vertical sides of the access opening. The bar is slidingly arranged by the guiding members in the rails and positioned at a predetermined horizontal level within the access opening for restraining objects from falling out of the compartment. By manually raising the bar, an object can be retrieved from the compartment after which the bar automatically will return to its previous restraining level by gravity. The apparatus is particularly designed for use on airplanes, moving vehicles, etc. and is provided with features to assure a rattle free and noiseless operation as well as quick installation and removal features.

10 Claims, 11 Drawing Figures

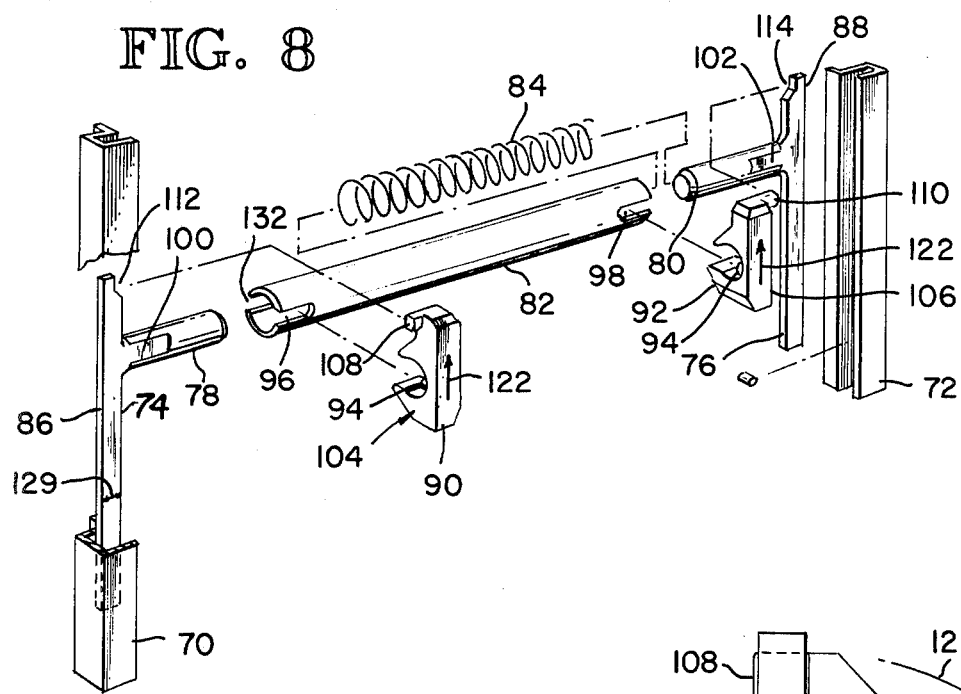
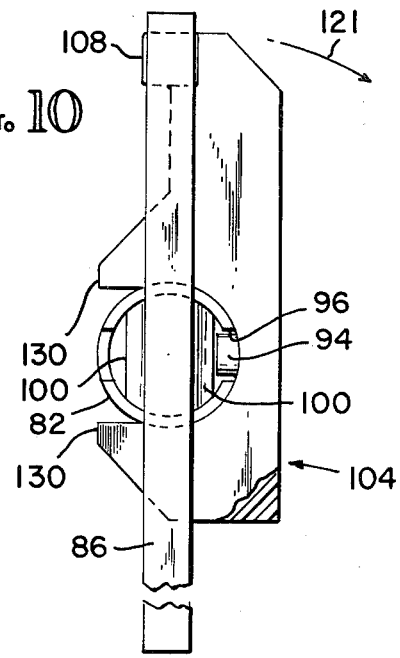
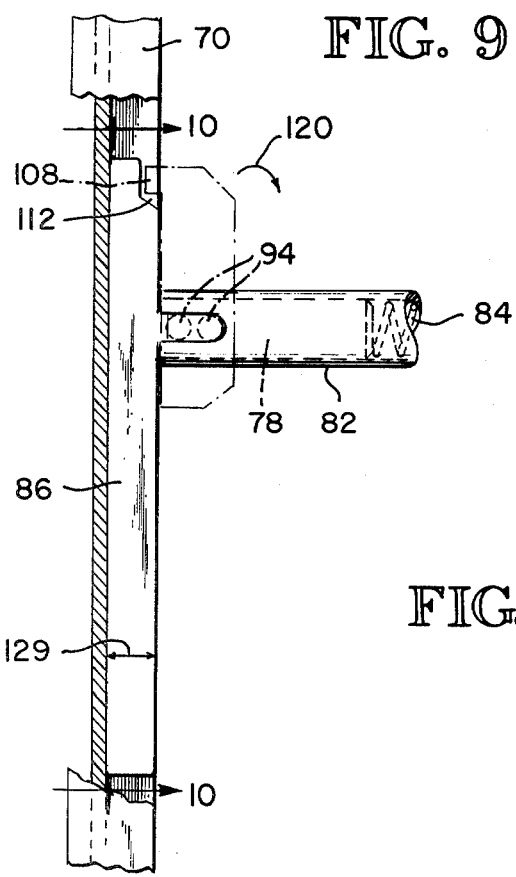
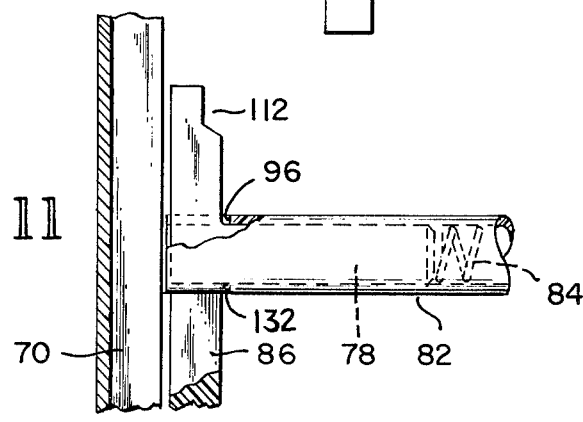

RESTRAINING APPARATUS FOR BOOKCASES

CROSS REFERENCES TO RELATED APPLICATIONS

This application is a continuation-in-part of co-pending application Ser. No. 878,754 filed Feb. 17, 1978 entitled "Sliding Restraining Device for Articles" and now abandoned.

BACKGROUND OF THE INVENTION

1. Field of the Invention

The present invention relates to restraining devices in cabinets for mobile vehicles and in particularly for restraining magazines and books in bookcases in aircraft.

2. Prior Art

The present invention appears to be solving a problem which was normally solved by using a door with locking means, a slidable fence or the like. However, storing magazines, books, etc. in an open or doorless compartment seems more appealing to the public because one can readily determine the contents of the compartment on sight and be able to obtain a book or article.

In moving vehicles such as aircraft, boats, trains, camping trailers, etc., an open bookcase has been used in the past but without restraining means.

A search in this particular art was therefor difficult to perform, however, various classes in the patent art were checked and the most pertinent art was shown in U.S. Pat. No. 203,080 by Sherman in 1878. Sherman teaches a construction which includes a hingeable, springloaded bar for retaining a book against a wall.

Another and closer resemblance to the present invention, but in a different art class, was noted in U.S. Pat. No. 2,624,055 by Rude. The invention teaches spring-loaded, horizontally sliding bars for restraining a person in a bed.

The most recent patented device of interest was noted in U.S. Pat. No. 3,309,135 which relates to restraining objects on car seats.

SUMMARY OF THE INVENTION

The present invention is a restraining bar which is utilized, in particular, in aircraft. The restraining bar is slidably positioned at a predetermined level in the access opening of a magazine compartment. An open magazine compartment is attractive and appealing to the public since one can readily spot which reading material is available.

However, up to the present the open magazine compartment has had the problem that when the airplane makes some rough maneuvers, the magazines slide out of the open compartment. Therefore, the open compartments in airplanes have been positioned in corridors so that the landing or take-off movement of the airplane will not disturb the stored magazines since they are placed perpendicular to the longitudinal axis of the airplane. Only left or right banking would remove the magazines. These days, however, the airplanes' landing and take-off profiles are steeper and their banking patterns have become steeper also.

Accordingly, the open magazine compartment has become a nuisance to the present airplane interior and personnel, as well as dangerous to the passengers.

The present invention solves the problem and also provides for the possibility of locating open magazine storage compartments in every location, such as in the longitudinally as well as transversely located corridors in the airplane.

Another very important requirement necessitating the present invention is the present Federal Aviation Agency Airworthiness Standard No. 25.789 which reads as follows:

"25.789 Retention of items of mass in passenger and crew compartments

Means must be provided to prevent each item of mass (that is part of the airplane type design) in a passenger or crew compartment from becoming a hazard by shifting under the appropriate maximum load factors corresponding to the specified flight and ground load conditions, and to the emergency landing conditions of . . . [etc.]"

Currently, the present disclosed restraining apparatus will be incorporated on Boeing aircraft in production at the present time, and its future use on other types of transportation vehicles is under study.

The restraining apparatus can be installed on new or existing magazine storage compartments in a number of different ways.

The restraining apparatus is designed with a minimum of moving parts so it is practically maintenance free after installation.

Although designed primarily for the aircraft industry, the restraining apparatus may also be used for the same or similar functions in recreational vehicles, campers, trailers, vans and the marine industry.

In general, the present invention relates to a restraining apparatus for open access storage compartments for moving vehicles. The combined assembly comprises a first and a second rail member, each substantially vertically mounted at the compartment vertical sides adjacent of the access opening. Furthermore, there are a first and a second guiding member which are disposed for sliding and retention in the first and second rail members, respectively. A restraining member is substantially horizontally connected between the first and second guiding members so that the restraining member is adapted to move horizontally in up and down slidable guiding relationship.

In addition, a resilient member such as a spring is mounted between the restraining member and guiding members so that the assembly is retained between the rails in a non rattling relationship and with predetermined friction for convenient manual sliding movement of the restraining member, which preferably is a round shaped bar positioned at a predetermined level between the rails to prevent objects from sliding from the compartment when the vehicle moves in an off-planar position.

It is therefore an object of the present invention to provide for a restraining apparatus for storage compartments having an open access by a restraint that can be slid away for retrieving an object from the compartment and wherein the restraint silently and automatically repositions itself in the previous restraining location.

DESCRIPTION OF THE FIGURES

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 8 is an exploded illustration of the restraining apparatus which is the most preferred embodiment disclosed herein.

FIG. 9 is a half front view of the apparatus shown in FIG. 8 and assembled and partly sectionalized to show connection details.

FIG. 10 is a side view taken along line 10—10 of FIG. 9.

FIG. 11 is a view of the position of parts during installation or removal procedures of the apparatus.

DETAILED DESCRIPTION OF THE INVENTION

Figure 1:
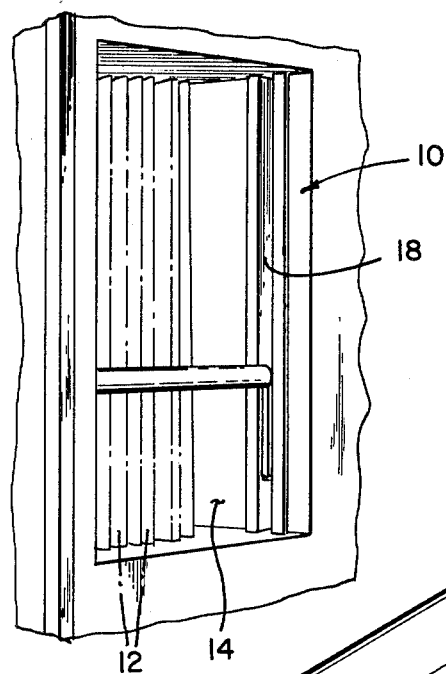
FIG. 1 is a perspective illustration of a magazine compartment provided with the restraining apparatus.

In the embodiment shown in FIG. 1, the open compartment or magazine case is a built-in compartment 10 which contains a few bound magazines or books 12.

Figure 2:
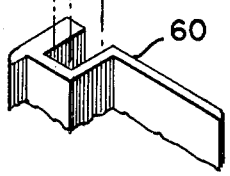
FIG. 2 is a front view of the compartment with the hidden parts shown in dashed lines.
Figure 2:
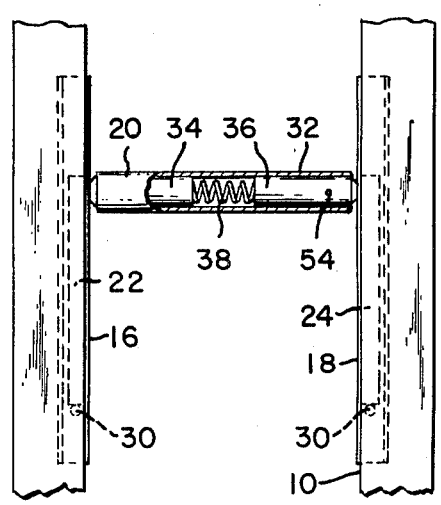

At each vertical side of the compartment 10 adjacent the access opening 14 is a lefthand or first rail 16 not visible in the perspective illustration of FIG. 1 and a righthand or second vertical rail 18. A restraining member 20 is a round bar of metal, which is horizontally arranged between the rails 16 and 18. This arrangement is accomplished by a connection to the rails via two guiding members 22 and 24 located at each end of the bar 20 respectively. The first and second guiding members 22 and 24 have preferably a surface of slidable or non-frictional material such as teflon, plastic or the like so that lubricants are avoided. Since the bar 20 has a certain weight and is kept in a horizontal and perpendicular relationship with the rails, it will be easy to lift the bar 20, and upon release the bar will return to its previous position. This previous position is at a height or level which is predetermined and relates to the height of the books or magazines 12. In general, the bar 20 may be positioned at approximately a ⅓ to ½ of the height of the average book 12 kept in the compartment 10. If the guiding members 22 and 24 are long enough inside of the rails 16 and 18, then the length of the guiding member may position the bar 20 at the correct horizontal level. Otherwise, one may install stopping means 30 such as pins, fillers or the like. As indicated in FIG. 2, the bar 20 comprises an outside tube 32 which contains a pair of slidingly positioned inner tubes 34 and 36 which are separated by a spring 38. When the restraining device is utilized in a moving craft, it will be necessary to avoid rattling noise which, because of existing vibrations in the moving craft, would occur. Therefore, in its preferred embodiment, the spring 38 is utilized and will produce a continuous slight pressure to each side of the inner tubes 34 and 36. Since the tubes are slidably arranged in the outside tube 32 and connected to the guiding members 22 and 24, the guiding members are pushed inside the rails 16–18. Thus, a non-vibrating and yet sliding connecting arrangement is provided between the bar or movable part and the rails or non-movable part of the restraint device or system. To prevent the outer tube 32 from sliding against the rails, a pin 54 is used to keep the tube 32 centered between the rails as shown in FIG. 6.

Figure 4:
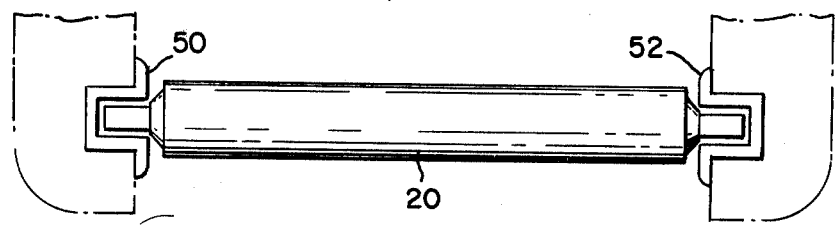
FIG 4 is a plan view of a typical installation of the apparatus.
Figure 5:
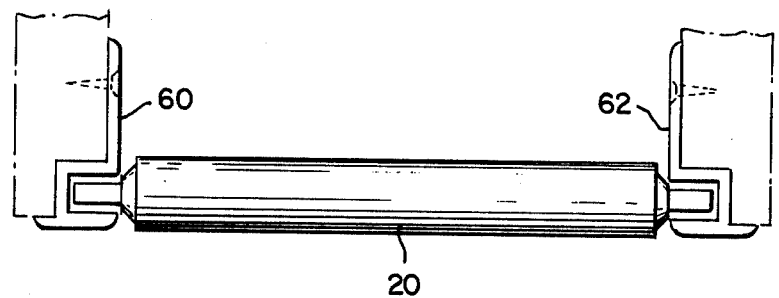
FIG. 5 is another typical installation.

FIGS. 4 and 5 are plan views of slightly different configurations of the present invention. The major differences are in the rail extrusions wherein FIG. 4 shows a built-in rail 50–52 assembly and FIG. 5 shows a built-in rail 60–62 assembly that serves simultaneously as an outside cabinet trim.

Figure 6:
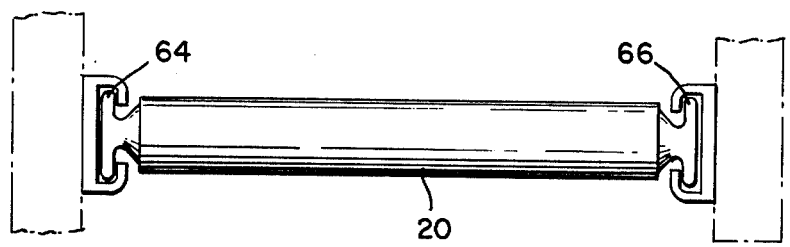
FIG. 6 is an installation which is preferable for existing open compartments.

The configuration shown in FIG. 6 is one that is somewhat different since the guiding members 64–66 are integrally incorporated with the sliding inner tubes. This particular configuration would be very handy for rebuilding existing cabinets with the present invention.

Figure 3:
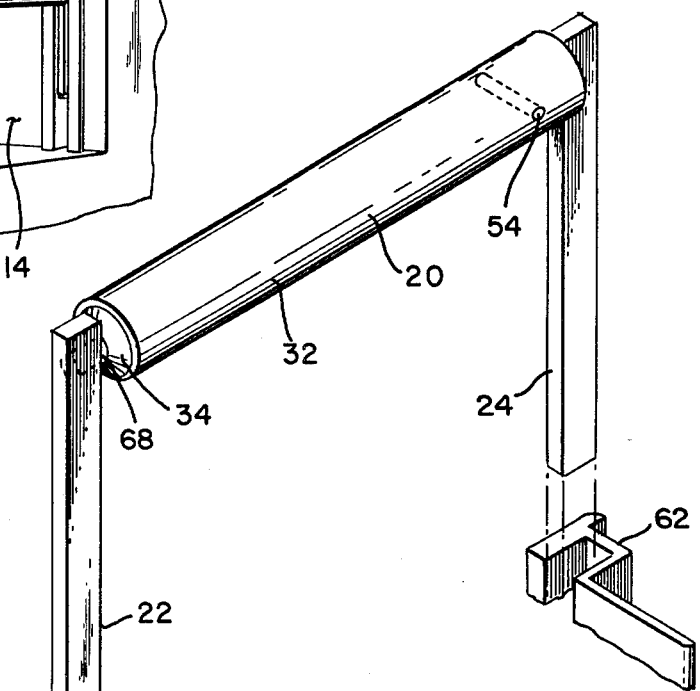
FIG. 3 is an isometric illustration of the restraining bar and guides elevated from rail sections.

In another arrangement, the connection of the inner tubes 34–36 to the guiding members 22–24 is provided by a pivot type of arrangement 68 as shown in FIG. 3. Furthermore, FIG. 3 shows the rails as being one part with the outside trim of the cabinet and accordingly it may be manufactured in a rectangular shape so that installation of the complete restraining assembly comprises the installing of a rectangular frame or trim shape, inclusive with bar, assembly.

Figure 7:
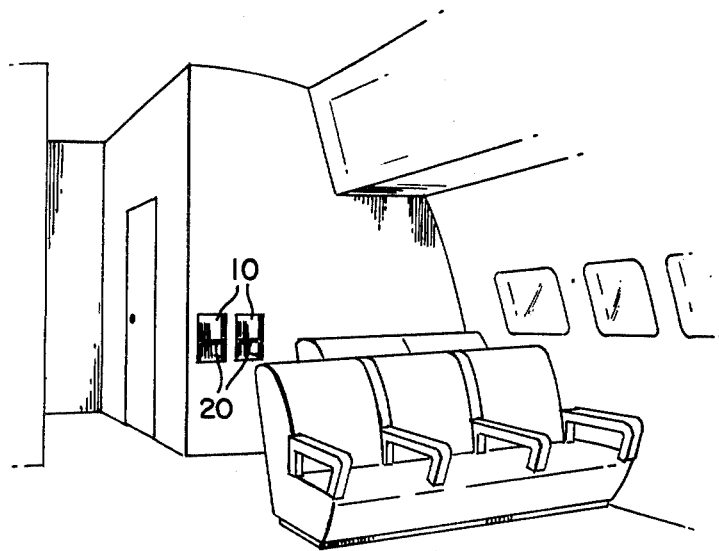
FIG. 7 is an overall aircraft interior arrangement with magazine compartments provided with the teachings of the present invention.

For purposes of illustration and thorough understanding, the view provided in FIG. 7 has the magazine compartment 10 located with its access opening perpendicular to the longitudinal axis of the airplane and magazines are retained by the present restraining apparatus, regardless of landing, banking or take-off conditions.

The apparatus disclosed in FIGS. 8–11 has been tested and appears to be the preferred restraining bar apparatus from the operational as well as from the installation and manufacturing viewpoints. The basic principle of operation is similar to the above described and shown configurations, however, several novel improvements have been incorporated. These improvements provide for a maintenance free and reliable apparatus and a simplified installation and removal procedure. Referring to FIGS. 8–11, the apparatus includes a first vertical and a second vertical guiding rail 70 and 72, respectively, which are the non-movable members installed in the bookcase 10 or the like. A first and a second guiding member 74 and 76 are slidably positioned in the rails 70 and 72, respectively. The rails 70–72 or the guiding members 74–76, or both, but preferably the guiding members, are coated or made from a frictionless material such as plastic, teflon or the like. Each guiding member 74–76 comprises of a vertically extended portion having a horizontally extended portion 78–80, respectively, which last one has a circumference that fits properly inside of the hollow restraining bar 82. It is essential, for the proper operation of this preferred restraining apparatus, that a spring 84 is utilized within the bar 82 for providing an equal pressure to each extended portion 78–80. This pressure results in the fact that the guiding members 74–76 outside long flat surfaces 86–88, respectively, are resting completely anf flatly against the inside flat surfaces of the rails 70–72. Accordingly, upon movement of the bar 82, the guiding members will slide smoothly and siliently within the rails 70–72. It will be understood that a predetermined spring pressure is required, which appears to be rather light and can be adjusted manually by the installer by extending or condensing the metal spring 84. If the spring pressure is too strong, the raising of the bar 82 requires more force and the release of the bar will keep the bar at the releasing position. If the spring has the proper tension, then the bar 82 can be manually raised by a slight upward pressure and upon release, the bar will slowly, not fast, and without a sound, reposition itself to the previous book restraining location. Thus, it can be seen that the spring 84 provides for an equally balanced retaining tension, and together with the other components in the assembly produces the impressive automatic return of the bar 82 analogous to the movements of electronic and/or remotely controlled apparatus such as automatically moving garage doors, up and down moving car antennas, etc. In airplanes in particular, where many persons are using the book cabinets, it would be irritating if noisy doors or book retaining means were utilized, and therefore the operation of the present disclosed book restraining bar apparatus appears to be the perfect solution.

In order to connect the bar 82 at each end to the extended portions 78 and 80, a clamping member or means 90 and 92, made preferably from a resilient material, is snapped about the bar ends as shown in FIGS. 9 and 10. The clamping means 90 and 92 are each provided with protrusions 94 which fit into the slots 96 and 98 at each end of the bar 82 and coincide with the flat spots 100 and 102 on the extended portions 78 and 80. This fitting will prevent rotation of the bar 82 but more importantly, it will position the guide members 74-76 in correct relationship to the bar 82 and will simultaneously position the clamping means 90-92 in the correct location next to the rails 70-72, respectively. When the clamping means 90-92 are installed, the guide members 74-76 cannot move out of the bar 82 nor into the bar 82 except for a predetermined tolerance or width. In other words, the clamping connection of the clamping means 90-92 provides for a junction or structural joint at each end of the bar 82. This junction provides an additional improvement or feature which can be found in that the flat surface sides 104 and 106 of each clamping means 90-92 which travels adjacent the rail sides 70-72, respectively, result in additional guiding control to keep the bar 82 horizontal in respect to the vertically positioned rails 70-72. This guiding control opposes any unwanted manual pressures on the bar 82 which may be asserted in a left or right diagonal direction to the cabinet 10's vertical sides. Therefore, the clamping means 90-92 which are preferably provided with a directional arrow 122 for the user, act through the surfaces 104-106 as an external guidance versus the guiding members 74-76 which are the internal guidance means. The clamping means 90-92 are further provided with a locking means 108-110 which fit into the rails 70-72 above the niches or cutouts 112-114 of the guiding members 74-76, respectively. The locking means 108-110 prevent easy removal of the clamping means or members 90-92 and furthermore prevent rotation of the clamping means 90-92 about the bar 82. Installation of the clamping means 90-92 about the bar 82. Installation of the clamping means 90-92 requires first the insertion of the locking means 108-110 into the rails 70-72. Removal of the clamping means 90-92 requires the twisting out of the rails 70-72 of the locking means 108-110 as indicated by the arrow 120. Since the clamping means 90-92 are also provided with clamping jaws 130, a snapping on force upon installation or a pull-off force upon removal, from or to the bar 82, respectively, is required in the direction as indicated by arrow 121.

The complete assembly and installation is accomplished by inserting the guiding members 74-76 into the bar 82 which is provided with the spring 84. The guiding member 76 is inserted into the rail 72 while the left side of the bar will extend beyond the width of the cabinet 10 opening, because the total length of the bar 82 including the width 129 of guiding members 74-76 is longer. At this moment the installer will rotate the bar 82 for 90 degrees so that the slot 96 and the opposite slot 132 align with the guiding member 74. This will allow the guiding member to temporarily slide into the double slot in the lefthand side of the bar 82, as shown in FIG. 11. Accordingly, the assembly of bar 82 and guiding members 74-76 can be inserted between the rails 70-72 and the guiding member 74 can be slid into the rail 70. Thereafter, the installer will rotate the bar 82 for 90 degrees back to its previous position. The clamping means 90-92 are snapped into place as described above and the installation is completed. It should be noted that the bar 82 needs a double slot 96-132 on one end and a single slot 98 on the other end. Removal of the bar 82 follows the same procedure in the reversed order.

Although for the sake of concreteness, certain of the components, parts and arrangements have been particularized with limited specificity as to their particular shapes, etc., nonetheless such specificness in nowise limits the nature or scope of the essence of the invention. The latter is to be taken as bounded only by the scope and range of equivalents of the sub-joined claims, which define the inventive advances in terms of the essential physical syntheses of essential constructional elements.

Now, therefore I claim:

1. A restraining apparatus for an open access storage compartment in moving vehicles comprising in combination:
   (a) a first and a second rail, each substantially vertically mounted at said associated compartment vertical sides adjacent said compartment access opening;
   (b) a first and a second guiding member slidingly disposed in said first and said second rail member respectively;
   (c) a restraining bar substantially horizontally located between said first and said second rail and connected at each end to said first and said second guiding member respectively; and
   (d) a spring located inside of said restraining bar for providing a predetermined force to said first and said second guiding members, disposed in said first and said second rail, for obtaining a non-vibrating arrangement and a controlled sliding pressure inside of said first and said second rail, whereby said restraining bar is adapted to move manually horizontally upwards and upon manual release horizontally downwards in a speed controlled fashion.

2. A restraining apparatus for an open access storage compartment, as claimed in claim 1, wherein said connection between said first and said second guiding member to said restraining bar is one integral connection.

3. A restraining apparatus for an open access storage compartment, as claimed in claim 2, wherein said first and said second guiding member has a bearing surface of a material such as plastic, teflon or the like.

4. A restraining apparatus for an open access storage compartment, as claimed in claim 1, wherein each said first and said second guiding member comprises a vertically extended portion provided with a horizontally extended portion, said horizontally extended portion made to fit within said restraining bar end.

5. A restraining apparatus for an open access storage compartment, as claimed in claim 4, wherein each said horizontally extended portion is provided with a flat spot forming a reduced thickness adjacent said guiding member vertical extended portion.

6. A restraining apparatus for an open access storage compartment, as claimed in claim 5, wherein said restraining bar is provided with a slot at each end of said bar and said slots are located at a line parallel to said bar longitudinal axis.

7. A restraining apparatus for an open access storage compartment, as claimed in claim 6, wherein said apparatus comprises:
   (a) a pair of clamping members;
   (b) said clamping members having a locking means, jaws and a protrusion;
   (c) said locking means adapted to be inserted and retained within said rail adjacent said clamping member;
   (d) said jaw having an internal circumference to provide for a snap-on clamping connection about said restraining bar;
   (e) said protrusion adapted to coincide with said flat spot on said horizontally extended portion; so that each said clamping member performs a locking guiding junction with said rail by said locking means, a clamping snap-on connection to said bar by said jaw and a locked-in connection between said horizontally extended portion and said bar by said protrusion through said slot unto said flat spot.

8. A restraining apparatus for an open access storage compartment, as claimed in claim 7, wherein said restraining bar is provided with an additional slot at one end and wherein said additional slot is located directly opposite of said slot at said same end so that a double slot arrangement exists at one end of said bar, which double slot is adapted to receive said guiding member vertically extended portion by moving said horizontally extended portion of said guiding member deeper into said bar during installation or removal of said restraining apparatus when said restraining bar has been turned temporarily 90 degrees so that said first and said second guiding member and said restraining bar can be moved in assembled condition through said access opening.

9. A restraining apparatus for an open access storage compartment, as claimed in claim 8, wherein each said clamping member has a flat surface adjacent said rail nearest said clamping member in installed condition, and wherein said flat surface acts as an external guidance control for said restraining bar.

10. A restraining apparatus for an open access storage compartment, as claimed in claim 9, wherein said guiding members are made from a frictionless material such as plastic, teflon or the like and wherein said clamping members are made from a resilient material.

* * * * *